(12) United States Patent
Xiang et al.

(10) Patent No.: US 11,487,680 B2
(45) Date of Patent: Nov. 1, 2022

(54) APPARATUS AND METHOD FOR BURST MODE DATA STORAGE

(71) Applicant: Alibaba Group Holding Limited, Grand Cafyman (KY)

(72) Inventors: Xiaoyan Xiang, Shanghai (CN); Yimin Lu, Hangzhou (CN); Chaojun Zhao, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 126 days.

(21) Appl. No.: 17/017,252

(22) Filed: Sep. 10, 2020

(65) Prior Publication Data
US 2021/0097009 A1    Apr. 1, 2021

(30) Foreign Application Priority Data

Sep. 26, 2019  (CN) .......................... 201910916506.X

(51) Int. Cl.
*G06F 13/16* (2006.01)
*G06F 9/30* (2018.01)

(52) U.S. Cl.
CPC ...... *G06F 13/1678* (2013.01); *G06F 9/30043* (2013.01)

(58) Field of Classification Search
CPC .......................... G06F 13/1678; G06F 9/30043
See application file for complete search history.

(56) References Cited

U.S. PATENT DOCUMENTS

| | | | | | |
|---|---|---|---|---|---|
| 5,384,540 | A | * | 1/1995 | Dessel | G01R 31/60 324/66 |
| 5,557,734 | A | * | 9/1996 | Wilson | G06T 1/20 345/557 |
| 5,732,278 | A | * | 3/1998 | Furber | G06F 9/3824 712/E9.046 |
| 6,138,214 | A | * | 10/2000 | Pfefferl | G11C 7/1072 711/127 |
| 2001/0021971 | A1 | | 9/2001 | Gibson et al. | |
| 2016/0321071 | A1 | | 11/2016 | Hansen et al. | |

* cited by examiner

*Primary Examiner* — Zachary K Huson

(57) ABSTRACT

An apparatus and a method are disclosed. In the apparatus, a memory management unit includes: a first cache unit, adapted to store a plurality of first source operands and one first write address; a second cache unit, adapted to store at least one pair of a second source operand and a second destination address; a write cache module, adapted to discriminate between destination addresses of a plurality of store instructions, so as to store, in the first cache unit, a plurality of source operands corresponding to consecutive destination addresses, and to store, in the second cache unit, non-consecutive destination addresses and source operands corresponding to the non-consecutive destination addresses, where the first write address is an initial address of the consecutive destination addresses; and a bus transmission module, adapted to transmit the plurality of first source operands and the first write address in the first cache unit to a memory through a bus in a write burst transmission mode. In embodiments of the present invention, a burst transmission mode is established between a processor and the bus. This can help reduce occupation of bus address bandwidth and accelerate write efficiency of the memory.

19 Claims, 6 Drawing Sheets

APPARATUS AND METHOD FOR BURST MODE DATA STORAGE

CROSS-REFERENCE TO RELATED APPLICATIONS

This application claims priority to Chinese Patent Application No. 201910916506.X filed Sep. 26, 2019, which is incorporated herein in its entirety.

TECHNICAL FIELD

The present invention relates to the field of processor manufacturing, and more specifically, to an apparatus and a method.

BACKGROUND OF THE INVENTION

In design of a processor, data is stored in a memory. In the processor, a data width of data (opcode) corresponding to an instruction is typically 8 bits, 16 bits, or 32 bits. A high-performance processor further includes the 64-bit data width. The processor transports instruction data using a load instruction, and stores a result in an external storage using a store instruction after computing. Some typical applications also need to continuously perform write operations on consecutive addresses of a memory, for example, memory transport and data generation of consecutive addresses. These write operations write data to a bus through consecutive store instructions, and finally writes the data to the memory. These write operations are implemented using store instructions. Each store instruction stores a maximum of 32 or 64 bits (the maximum data width of the processor) of data at a time.

For a high-performance processor, a data bit width of an external bus is more than 64/128 bits, and the above write operations performed on consecutive addresses only occupy half the bus data width or even less at a time. Generally, the bus introduces latency in transmission of, for example, handshake protocols. Continuous transmission of single writes is not efficient for consecutive write operations.

SUMMARY OF THE INVENTION

In view of this, the disclosed solution proposes an apparatus and a method to resolve the above problem.

To achieve this objective, according to a first aspect of the present invention, an embodiment of the present invention provides an apparatus, where the apparatus includes a memory management unit coupled to a memory through a bus, and the memory management unit includes:

a first cache unit, adapted to store a plurality of first source operands and one first write address;

a second cache unit, adapted to store at least one pair of a second source operand and a second destination address;

a write cache module, adapted to discriminate between destination addresses of a plurality of store instructions, so as to store, in the first cache unit, a plurality of source operands corresponding to consecutive destination addresses in the destination addresses, and to store, in the second cache unit, non-consecutive destination addresses in the destination addresses and source operands corresponding to the non-consecutive destination addresses in the destination addresses, where the first write address is an initial address of the consecutive destination addresses; and a bus transmission module, adapted to: transmit the plurality of first source operands and the first write address in the first cache unit to the memory through the bus in a write burst transmission mode, and sequentially transmit each pair of the second source operand and the second destination address in the second cache to the memory through the bus in another transmission mode.

In some embodiments, the first cache unit further stores indication data and flag data, where the indication data is used to indicate whether the plurality of first source operands are valid, and the flag data is used to indicate a consecutive manner of the destination addresses corresponding to the plurality of first source operands.

In some embodiments, the bus transmission module includes:

a burst determining unit, adapted to: determine, based on the indication data and the flag data, whether the write burst transmission mode can be started, and determine whether the destination addresses corresponding to the plurality of first source operands are increasing consecutive addresses or decreasing consecutive addresses; and a burst transmission unit, adapted to: if the destination addresses corresponding to the plurality of first source operands are increasing consecutive addresses, transmit the first write address and the plurality of first source operands to the bus in the write burst transmission mode; and if the destination addresses corresponding to the plurality of first source operands are decreasing consecutive addresses, send the first write address, identifiers indicating the decreasing consecutive addresses, and the plurality of first source operands to the bus in the write burst transmission mode.

In some embodiments, the bus directly forwards the first write address and the plurality of first source operands to the memory, and the memory performs different write operations based on increasing consecutive addresses or decreasing consecutive addresses.

In some embodiments, the bus adjusts the plurality of first source operands from decreasing consecutive addresses to increasing consecutive addresses, and sends the adjusted plurality of first source operands and the first write address to the memory.

In some embodiments, the plurality of first source operands are combined into a plurality of pieces of write data that all have a same data length, and data transmission is performed in the write burst transmission mode with a piece of write data as a unit.

In some embodiments, the data length of the write data is equal to a data bit width of the bus.

In some embodiments, the write burst transmission unit is further adapted to: when the data length of the write data is less than a data bit width of the bus, indicate, by using a cut-off flag, valid data transmitted to the bus.

In some embodiments, the bus transmission module performs data transmission in the write burst transmission mode in an address and data separated manner.

In some embodiments, the apparatus is further adapted to determine, based on a time requirement of a store instruction corresponding to the initial address, whether to start the bus transmission module now.

In some embodiments, the write cache module is further adapted to acquire source operands and destination addresses of the plurality of store instructions from a cache within an LSU (Load/Store Unit) component of an instruction pipeline structure.

In some embodiments, the apparatus is a processor core or a processor, and the bus and memory are located inside the apparatus.

In some embodiments, the apparatus is a processor core or a processor, and the bus and memory are located outside the apparatus.

According to a second aspect, an embodiment of the present invention provides a method, including:

acquiring source operands and destination addresses of a plurality of store instructions cyclically;

storing a plurality of first source operands corresponding to consecutive destination addresses and an initial address of the consecutive destination addresses in the first cache unit; and transmitting the plurality of first source operands and the initial address in the first cache unit to a memory through a bus in a write burst transmission mode.

In some embodiments, the first cache unit further stores indication data and flag data, where the indication data is used to indicate whether the plurality of first source operands are valid, and the flag data is used to indicate a consecutive manner of the destination addresses corresponding to the plurality of first source operands.

In some embodiments, the transmitting the plurality of first source operands and the initial address in the first cache unit to a memory through a bus in a write burst transmission mode further includes:

determining, based on the indication data and the flag data, whether the write burst transmission mode can be started, and determining whether the destination addresses corresponding to the plurality of first source operands are increasing consecutive addresses or decreasing consecutive addresses;

when the destination addresses corresponding to the plurality of first source operands are increasing consecutive addresses, transmitting the initial address and the plurality of first source operands to the bus in the write burst transmission mode; and when the destination addresses corresponding to the plurality of first source operands are decreasing consecutive addresses, sending the initial address, identifiers indicating the decreasing consecutive addresses, and the plurality of first source operands to the bus in the write burst transmission mode.

In some embodiments, the bus directly forwards the first write address and the plurality of first source operands to the memory, and the memory performs different write operations based on increasing consecutive addresses or decreasing consecutive addresses.

In some embodiments, the bus adjusts the plurality of first source operands from decreasing consecutive addresses to increasing consecutive addresses, and sends the adjusted plurality of first source operands and the initial address to the memory.

In some embodiments, the plurality of first source operands are combined into a plurality of pieces of write data that all have a same data length, and data transmission is performed in the write burst transmission mode with a piece of write data as a unit.

In some embodiments, the data length of the write data is equal to a data bit width of the bus.

In some embodiments, the method further includes: when the data length of the write data is less than a data bit width of the bus, indicating, by using a cut-off flag, valid data transmitted to the bus.

In some embodiments, the method further includes: determining, based on a time requirement of a store instruction corresponding to the initial address, whether to start data transmission now.

According to a third aspect, an embodiment of the present invention provides a computer system, where the computer system includes the apparatus according to any one of the above embodiments.

According to a fourth aspect, an embodiment of the present invention provides a system-on-chip, where the system-on-chip includes the apparatus according to any one of the above embodiments.

Compared with the prior art, embodiments of the present invention have the following advantages: Among source operands of a plurality of store instructions, a plurality of first source operands that correspond to consecutive destination addresses are stored, and an initial address of the consecutive destination addresses is used as a first write address, and the plurality of first source operands are transmitted using the first write address in the burst transmission mode, such that occupation of a bus address bandwidth can be reduced, and memory write efficiency can be improved.

BRIEF DESCRIPTION OF THE DRAWINGS

The above and other objectives, features and advantages of the present invention will become more apparent from the description of the embodiments of the present invention with reference to the following accompany drawings. In the drawings.

DETAILED DESCRIPTION OF THE INVENTION

Figure 1:
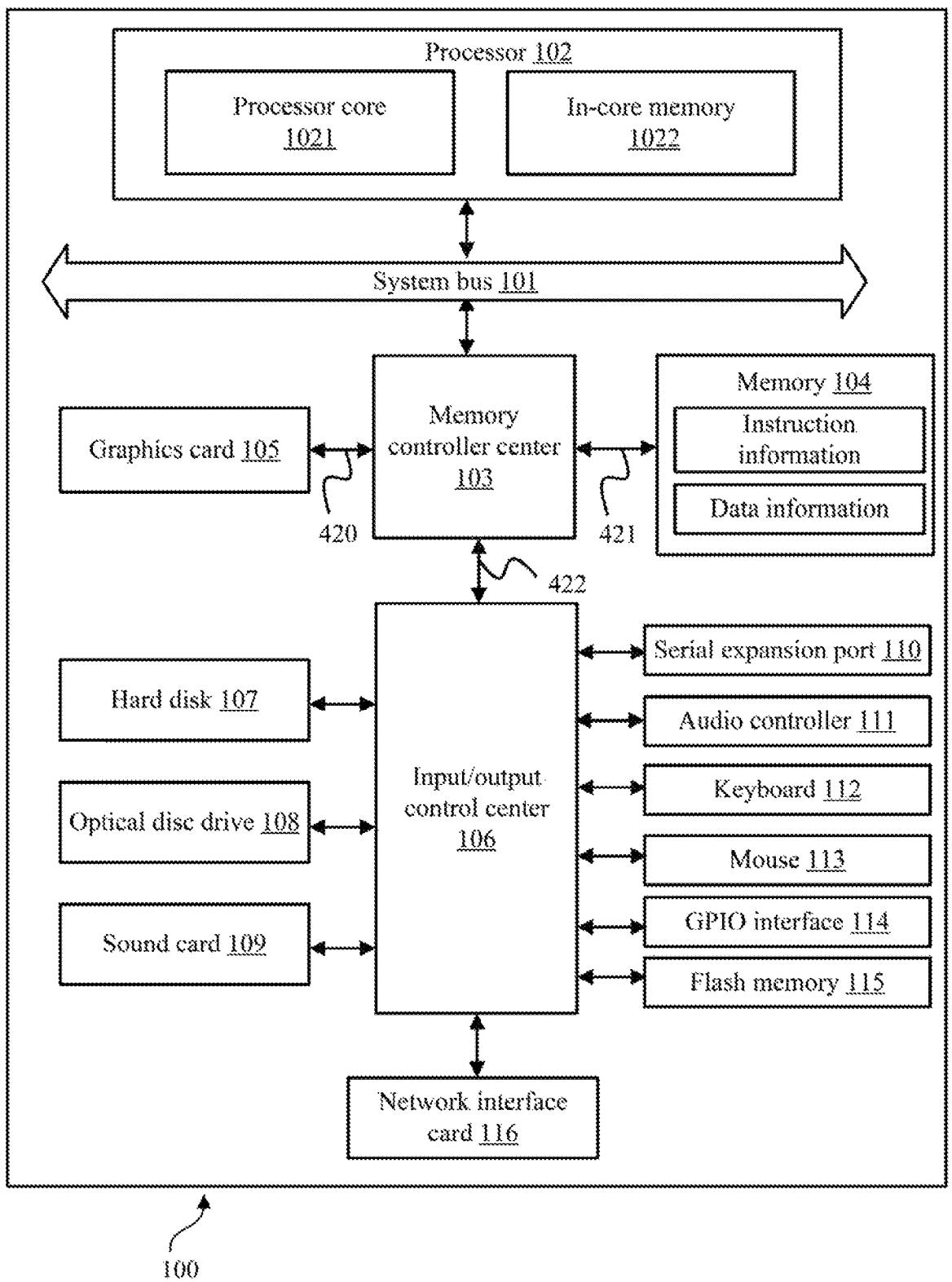
FIG. 1 is a schematic structural diagram of a computer system used for implementing an embodiment of the present invention.

The present invention is described below based on embodiments, but the present invention is not limited to these embodiments. In the following detailed description of the present invention, some specific details are described. Without the description of such details, those skilled in the art can still fully understand the present invention. To avoid confusing the essence of the present invention, well-known methods, processes, and procedures are not described in detail. In addition, the accompany drawings are not necessarily drawn to scale.

The following terms are used in this specification.

Bit width supported by a processor: The bit width refers a data bandwidth at which the processor executes instructions at a time. Currently, a minimum bit width of the processor is 8 bits, and maximum bit widths include 16 bits, 32 bits, and 64 bits.

Data bit width of a bus: refers to a maximum data bandwidth that an external bus can transmit at a time.

Instruction pipelining: Instruction pipelining is a method of improving efficiency of a processor in executing instructions. In this method, processing of an instruction is divided into a plurality of steps of micro-operations and each step is completed by a dedicated circuit. Currently, mainstream instruction pipeline techniques include three-stage, four-stage, five-stage, seven-stage, and super-stage instruction pipelines, and the like. For example, a five-stage instruction pipeline illustrated in textbooks includes an instruction fetch stage, a decoding stage, an execution stage, a memory access stage, and a write-back stage. The instruction fetch stage, the decoding stage, the execution stage, the memory access stage, and the write-back stage are referred to as an instruction fetch unit, a decoding unit, an execution unit, a memory access unit, and a write-back unit herein, respectively.

Pipeline structure: A combination of software and hardware that implements instruction pipelining is referred to as an instruction pipeline structure.

Write burst transmission: or write burst, is a continuous transmission protocol in a bus protocol. Generally, in a bus, a burst transmission protocol includes one piece of address information and a plurality of pieces of data information, meaning that the plurality of pieces of data information is stored into consecutive addresses or consecutive and aligned addresses, starting from that address. For example, in a continuous transmission protocol of OCP, a write address channel sends a write burst transmission. The transmission specifies a data width of 128 bits, a burst type of wrap, and a transmission length of 4. This means sending a write transmission of four pieces of 128-bit data, to 4×128-bit aligned addresses. In this case, the bus receives four pieces of 128-bit data on the write data channel. In this specification, write burst transmission is sometimes referred to as a write burst transmission mode.

Write data: one write burst transmission specifies one piece of address information and a plurality of pieces of data information. In this specification, the one piece of data information in one burst transmission is called write data.

Source operand: refers to data to be written by a store instruction.

Destination address: refers to a storage location where a store instruction intends to write data. The destination address may be a physical address or a virtual address.

FIG. 1 is a schematic structural diagram of a processing system used for implementing the present invention. The processing system is, for example, a computer system. Referring to FIG. 1a, a system 100 is an example of a "central" system architecture. The system 100 can be constructed based on various types of processors available in the current marketplace and driven by operating systems such as WINDOWS™ operating systems, UNIX operating systems, or Linux operating systems. In addition, the system 100 is typically implemented in a PC, a desktop computer, a notebook, or a server.

As shown in FIG. 1, the system 100 includes a processor 102. The processor 102 has data processing capabilities well known in the art. It may be a processor of a complex instruction set computing (CISC) architecture, a reduced instruction set computing (RISC) architecture, a very long instruction word (VLIW) architecture, or may be a processor that implements a combination of the above instruction set computing architectures, or may be an electronic device constructed for a dedicated purpose.

The processor 102 is coupled to a system bus 101, and the system bus 101 can transmit data signals between the processor 102 and other components. The processor 102 may further include an internal memory 1022 and a processor core 1021 improved according to the technical solution provided by the embodiments of the present invention. Specific details are provided below.

The system 100 further includes a memory 104 and a graphics card 105. The memory 104 may be a dynamic random access memory (DRAM) device, a static random access memory (SRAM) device, a flash memory device, or another memory device. The memory 104 may store instruction information and/or data information represented by data signals. The graphics card 105 includes a display driver, adapted to control correct display of a display signal on a display screen.

The graphics card 105 and the memory 104 are coupled to the system bus 101 through the memory controller center 103. The processor 102 can communicate with the memory controller center 103 through the system bus 101. The memory controller center 103 provides a high-bandwidth memory access path 421 to the memory 104 for storing and fetching the instruction information and data information. Moreover, the memory controller center 103 and the graphics card 105 transmit a display signal through a graphics card signal input/output interface 420. The graphics card signal input/output interface 420 has, for example, an interface type such as DVI or HDMI.

The memory controller center 103 not only transmits digital signals between the processor 102, the memory 103 and the graphics card 105, but also bridges digital signals between the system bus 101, the memory 104, and an input/output control center 106.

The system 100 further includes the input/output control center 106 coupled to the memory controller center 103 through a dedicated hub interface bus 422, and connects some I/O devices to the input/output control center 106 through a local I/O bus. The local I/O bus is adapted to couple peripheral devices to the input/output control center 106, and further to the memory controller center 103 and the system bus 101. The peripheral devices include, but are not limited to, the following devices: a hard disk 107, an optical disc drive 108, a sound card 109, a serial expansion port 10, an audio controller 111, a keyboard 112, a mouse 113, a GPIO interface 114, a flash memory 115, and a network interface card 116.

Certainly, different computer systems have different structure diagrams depending on the mainboard, operating system, and instruction set computing architecture. For example, in many current computer systems, the memory controller center 103 is integrated into the processor 102, such that the input/output control center 106 becomes a control center coupled to the processor 103.

Figure 2:
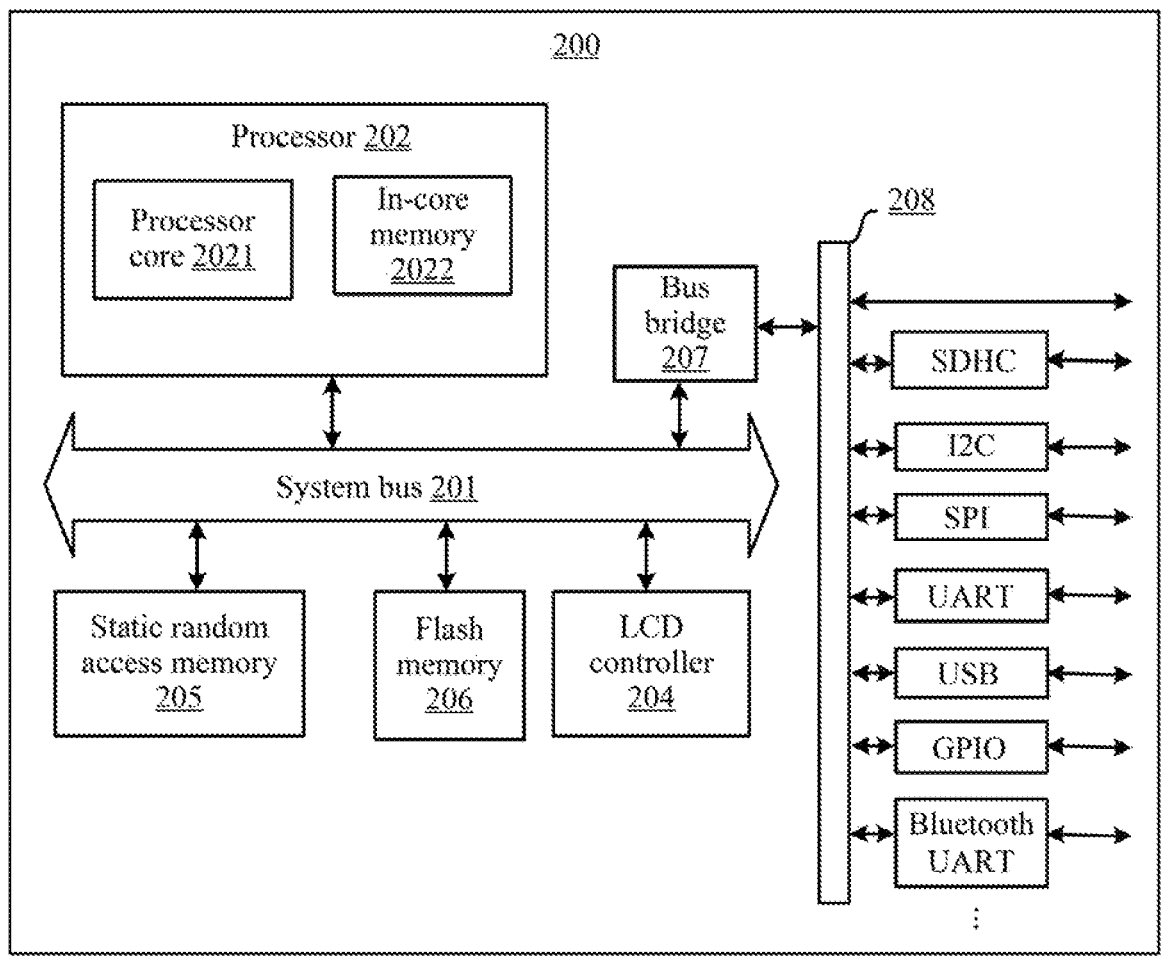
FIG. 2 is a schematic structural diagram of a system-on-chip used for implementing an embodiment of the present invention.

FIG. 2 is a schematic structural diagram of a system-on-chip 200 used for implementing the present invention. As a system-on-chip, the system 200 may be produced and sold as a separate device, or may be combined with other components to form a new device for production and sale.

The system 200 can be manufactured using many models of processors sold in the current marketplace and driven by operating systems such as WINDOWS™, UNIX, Linux, Android, and RTOS. The system 200 may be implemented in computer devices, handheld devices, and embedded products. Some examples of the handheld device include cellular phones, Internet Protocol devices, digital cameras, personal digital assistants (PDAs), and handheld PCs. The embedded products may include network computers (NetPC), set-top boxes, network hubs, wide area network (WAN) switches, or any other systems that can execute one or more instructions.

Referring to FIG. 2, the system 200 includes a processor 202, a static random access memory 205, an LCD controller 204, a flash memory 206, and a bus bridge 207 that are coupled through a system bus 201.

The processor 202 may be one of a complex instruction set computing (CISC) microprocessor, a reduced instruction set computing (RISC) microprocessor, a very long instruction word (VLIW) microprocessor, a microprocessor implementing a combination of the above instruction sets, or any other processor devices. The processor 202 further includes an internal memory 2022 and a processor core 2021 improved according to the technical solution provided by the embodiments of the present invention. Specific details are provided below.

The static random access memory 205 and the flash memory 206 are adapted to store instruction information and/or data information represented by data signals. For example, the static random access memory 205 can be adapted to provide a running space for various application programs to create heaps and stacks and store intermediate data for the various application programs. The flash memory 206 can store executable code of the various application programs and executable code of the operating system.

The system bus 201 is adapted to transmit digital signals between high-performance modules of the system 200, for example, between the processor 202 and the static random access memory 205, between the processor 202 and the LCD controller 204, between the processor 202 and the flash memory 206, and between the processor 202 and the bus bridge 207.

The bus bridge 207 is adapted to: bridge data transmission between the system bus and a peripheral bus, and implement conversion from a system bus protocol to a peripheral bus protocol by latching addresses, data, and control signals from the system bus and providing secondary decoding to generate selection signals of peripheral devices.

The system 200 may further include various interfaces coupled to the peripheral bus. The various interfaces include, but are not limited to, the following interface types: SDHC (Secure Digital High Capacity), I2C bus, serial peripheral interface (SPI, Serial Peripheral Interface), universal asynchronous receiver/transmitter (UART, Universal Asynchronous Receiver/Transmitter), universal serial bus (USB, Universal Serial Bus), general-purpose input/output (GPIO, General-purpose input/output), and Bluetooth UART. The peripheral devices coupled to the interfaces are, for example, USB devices, memory cards, packet transceivers, and Bluetooth devices.

It should be noted that with increase of SoC design complexity and continuous improvement of processing capabilities of processors, on-chip bus technologies are constantly evolving. Currently, there are two implementation solutions for the on-chip bus: One is to select an internationally open general bus structure, such as OCP (Open Core Protocol), and the other is to develop an on-chip bus independently for a specific field. Therefore, although the figure shows a bus structure that includes the system bus, the bus bridge, and the peripheral bus, bus structure choices are diverse because of restrictions of economic benefits and technical routes in actual system-level chip manufacturing processes. This in turn affects the structure of the on-chip bus.

In conclusion, it should also be noted that the systems shown in FIG. 1 and FIG. 2 are merely used to illustrate some application scenarios of the embodiments of the present invention, but are not intended to limit the embodiments of the present invention. The present invention implements improvements to existing processors or processor cores, and therefore is theoretically applicable to systems with an arbitrary processor architecture and an instruction set computing architecture.

Figure 3:
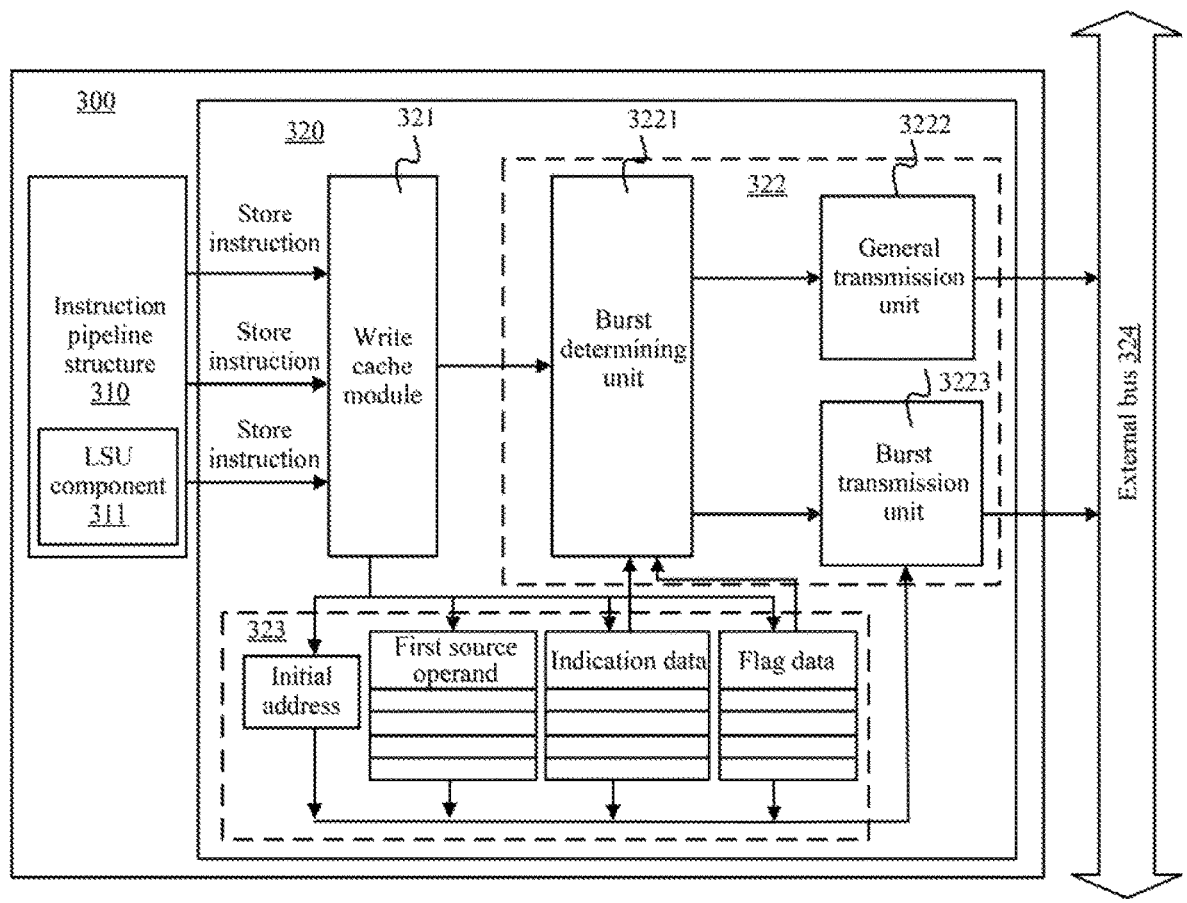
FIG. 3 is a schematic structural diagram of a processor used for implementing an embodiment of the present invention.

FIG. 3 is a schematic structural diagram of a processor 300 according to an embodiment of the present invention. In the figure, an arrow represents a coupling relationship between two or more units and a data transmission direction between two units.

Referring to FIG. 3, the processor 300 includes an instruction pipeline 310 and a memory management unit 320 that are coupled together. The instruction pipeline 310 and the memory management unit 320 may be included in a processor core. In this example, the instruction pipeline structure 310 may be an instruction pipeline structure of any number of stages. For example, a four-stage instruction pipeline including an instruction fetch unit, a decoding unit, a scheduler unit, and an execution unit, or a standard five-stage pipeline structure illustrated in textbooks may be used to implement this embodiment. This is not limited in the present invention.

For memory access instructions (store and load instructions), the instruction pipeline structure processes them using an LSU component (Load/Store Unit) of the structure and stores addresses and data in a cache inside the LSU component. When memory access instructions are retired from the instruction pipeline structure, the data needs to be stored in a cache or a memory inside or outside the processor core. Therefore, for the store instructions, the memory management unit 320 may fetch a source operand and a destination address of each store instruction from the cache inside the LSU component, or may fetch a source operand and a destination address of each store instruction from other locations.

The memory management unit 320 may include a first cache unit 323. The first cache unit 323 is adapted to store a plurality of source operands of the instructions that correspond to consecutive destination addresses and an initial address of the consecutive destination addresses. The first cache unit 323 may be implemented by using an internal memory (cache or memory) or register. As shown in the figure, the first cache unit 323 further stores indication data. The indication data is used to indicate whether the plurality of source operands corresponding to the consecutive destination addresses are valid. Currently, a minimum bit width supported by the processor is 8 bits, and therefore a data bit width of any source operand is a multiple of 8 bits. The indication data and flag data may include a plurality of indication bits, and each indication bit is one bit that corresponds to a data bit width of 8 bits. An example is used for illustration. If a data bit width of a source operand is 32 bits, 4 indication bits in the indication data indicate whether this first source operand is valid. If the first source operand is valid, the 4 indication bits are all set to 1; or if the first source operand is invalid, the 4 indication bits are all set to 0. Analogy can be drawn for source operands of other data bit widths. A data bit width of an external bus is usually an integer multiple of the minimum bit width supported by the processor. For example, the data bit width of the external bus is 64 bits or 128 bits.

The memory management unit 320 may further include a second cache unit (not shown). The second cache unit is adapted to store at least one pair of a second source operand and a second destination address. Alternatively, the second cache unit may be implemented by using an internal memory (cache or memory) or register.

In this embodiment, the memory management unit 320 may request a storage space for the first cache unit and/or the second cache unit all at one time, or may request a new storage space for a source operand and a destination address each time a store instruction is acquired.

The memory management unit 320 further includes a logic unit (including logic implemented by software and/or hardware) that is adapted to: discriminate between destination addresses of the plurality of store instructions and perform bus transmission according to a discrimination result. The logic unit may be divided into a write cache module 321 and a bus transmission module 322 by function. The write cache module 321 is adapted to acquire, from the instruction pipeline structure 310, the source operands and destination addresses of the plurality of store instructions that need to be written to the bus. For example, it may acquire the source operands and destination addresses of the plurality of store instructions from a cache inside an LSU component 311. The plurality of store instructions may be derived from one instruction pipeline, or may be derived from a plurality of instruction pipelines. A destination address of an earliest store instruction may be stored as an initial address in the first cache unit 323. The write cache module 321 discriminates between the destination addresses of the plurality of store instructions, so as to store, in the first cache unit 323, a plurality of source operands corresponding to consecutive destination addresses in the destination addresses, and to store, in the second cache unit, non-consecutive destination addresses and source operands corresponding to the non-consecutive destination addresses. Specifically, each time the write cache module 321 receives a source operand and a destination address of a store instruction, the write cache module 321 determines whether the destination address falls within an address range (which is calculated by using the initial address plus a size of a plurality of data units). In the case of a hit, the write cache module 321 stores the source operand of the store instruction in a corresponding location of the first cache unit, and sets flag bits in flag data.

The bus transmission module 322 checks the indication data. If all bits of the indication data are 1, the bus transmission module 322 may send the source operands in the first cache unit 323 at one time or a plurality of times according to the bus transmission protocol. An example is used for illustration. It is assumed that a size of the first cache unit is 128 bits. Then the indication data includes 16 (128/8) indication bits, and the 16 bits of indication data are initialized as '0000000000000000'. It is assumed that the initial address is 10000. Then the address range of the first cache unit should be [10000, 10015]. When a 32-bit write operation with an address of 10004 is sent, the write cache module 321 finds that the address falls within an address range of [10004, 10007], and therefore stores data of the write operation in that location, and modifies the 16-bit indication data to '0000000011110000', where 1 indicates that the data in the corresponding address is valid data. When checking that all the indication bits are 1, the bus transmission module 322 sends the plurality of source operands in the first cache unit 323 to an external bus 324. The external bus 324 may be the bus 101 in FIG. 1, or may be the bus 201 in FIG. 2. It should be understood that due to different bus types, values of relevant parameters need to be specified and sent according to corresponding bus protocol specifications.

In some embodiments, the first cache unit 323 further stores flag data. The flag data is used to indicate a consecutive manner of the consecutive destination addresses, including an increasing consecutive manner and a decreasing consecutive manner. For example, two flag bits of the flag data may be used to correspond to one source operand, indicating that the addresses are increasing consecutive when the flag bits are '01', and indicating that the addresses are decreasing consecutive when the flag bits are '11'. In the write cache module 321, when a destination address of a store instruction is acquired, a consecutive manner of the destination address needs to be checked in both directions. If the destination addresses are increasing consecutive, the flag bits are set to '01', otherwise the flag bits are set to '11'.

In some embodiments, the bus transmission module 322 may be further divided into a burst determining unit 3221, a general transmission unit 3222, and a burst transmission unit 3223. The burst determining unit 3221 determines, when a source operand of an earliest store instruction needs to be written to the external bus, whether a write burst transmission can be initiated by checking the flag data and the indication data in the first cache unit. If yes, the burst transmission unit 3223 is adapted to deliver the plurality of source operands to the external bus 324 in the burst transmission mode. A determining mechanism is that: Firstly, the indication data must be all set to '1', this indicates that corresponding data is all valid data; and then, whether the flag data is uniform, to be specific, whether the flag bits are all '01' or all '11'. Only after both the conditions are met, can the burst transmission unit 3223 be adapted for write burst transmission. An example is used for illustration. If there are 64-bit source operands in the first cache unit, and 32 bits are used as a granularity of write data for write burst transmission, then a burst transmission length is 2, and two pieces of 64-bit data are transmitted successively on a write data channel of the bus. In this case, a data width of the bus is 128 bits, which means that the bus data bandwidth is not fully occupied, and a cut-off flag needs to be used to specify which data is valid data. Certainly, in this example, alternatively, the general transmission unit 3222 may be used to write data in a granularity of 128 bits to the bus. It should be understood that the burst transmission mode has different specifications under different bus protocols, and therefore various applications need to be adjusted to suite actual conditions. The general transmission unit 3222 transmits the source operands and destination addresses in the second cache unit by using a transmission mode other than the write burst transmission mode. For one or more pairs of source operands and destination addresses in the second cache unit, the general transmission unit 3223 may initiate data transmission without waiting for the determining result of the burst determining unit 3221.

In this embodiment of the present invention, the burst transmission mode is established between the processor and the bus. This can help reduce occupation of bus address bandwidth and accelerate write efficiency of the memory.

As a preferred embodiment, to make full use of the data bit width of the external bus, source operands may further be combined with a data bit width of the external bus as write data, and then the data is written in the write burst transmission mode. An example is used for illustration. If the data bit width of the external bus is 128 bits, 128 bits are used as a piece of write data. If there are 4 pieces of such write data, the burst transmission length is 4. This means a write burst data transmission of 4×128 bits is sent, and the bus receives 4×128 bits successively on the write data channel. A quantity of pieces of write data in the burst transmission mode and a burst transmission type can both be set freely. Therefore, this implementation can not only make use of advantages of the burst transmission mode, but also make full use of the data bit width in the bus transmission bandwidth of the external bus, allowing bus transmission to break through the limitation of a maximum bit width supported by the processor.

Figure 4:
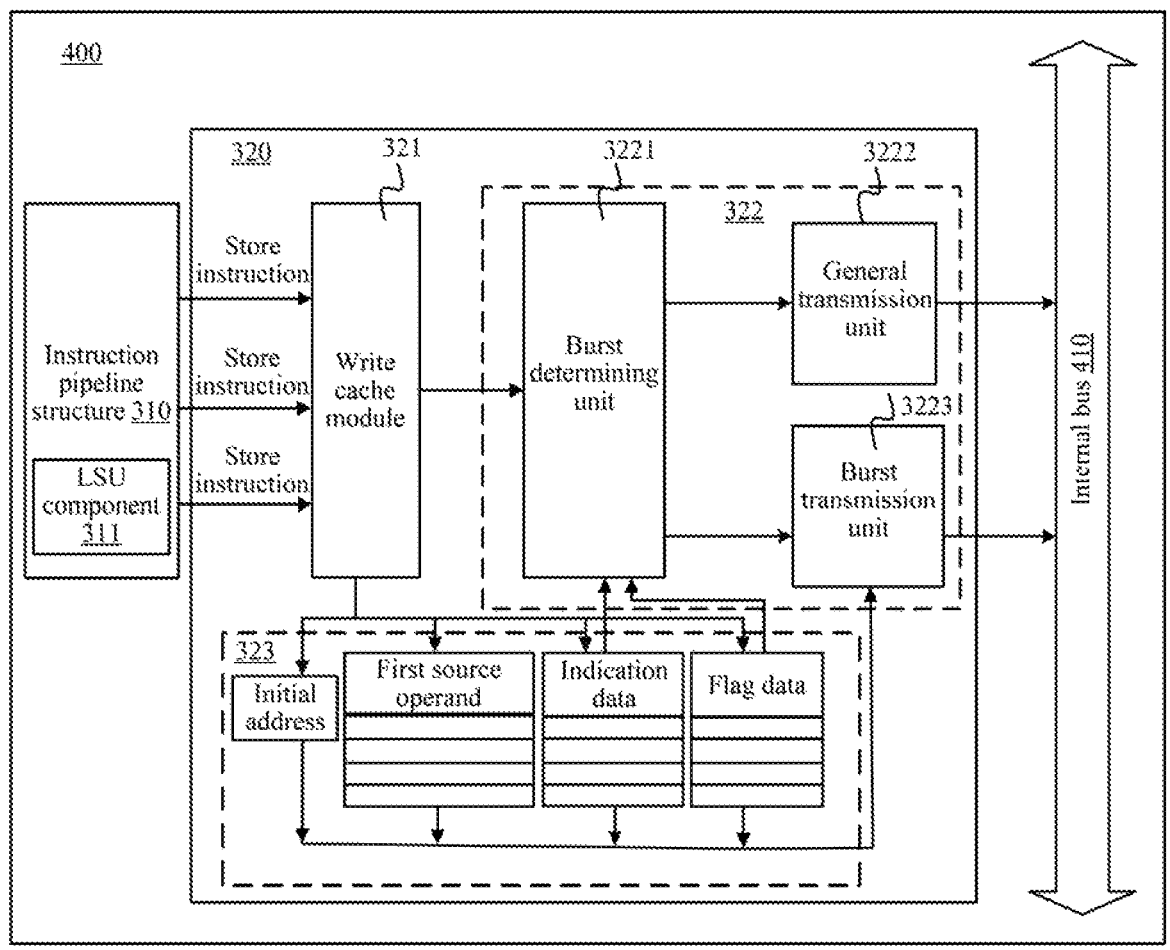
FIG. 4 is a schematic structural diagram of a processor used for implementing another embodiment of the present invention.

FIG. 4 is a schematic structural diagram of a processor used for implementing another embodiment of the present invention. In addition to the instruction pipeline 310 and memory management unit 320 that are coupled to each other, a processor 400 in FIG. 4 further includes an internal bus 410 and an internal memory (not shown) coupled to the processor 400 through the internal bus 410. Optionally, the instruction pipeline 310, the memory management unit 320, the internal bus 410, and the internal memory may all be located in a processor core; or the instruction pipeline 310 and the memory management unit 320 are located in a processor core, and the internal bus 410 and the internal memory are located in the processor. In the present invention, the write burst transmission mode needs to discriminate between increasing consecutive and decreasing consecutive write operations. Therefore, it can be indicated in the data specifications of the bus whether a current write burst transmission is increasing consecutive or decreasing consecutive.

Figure 5A:
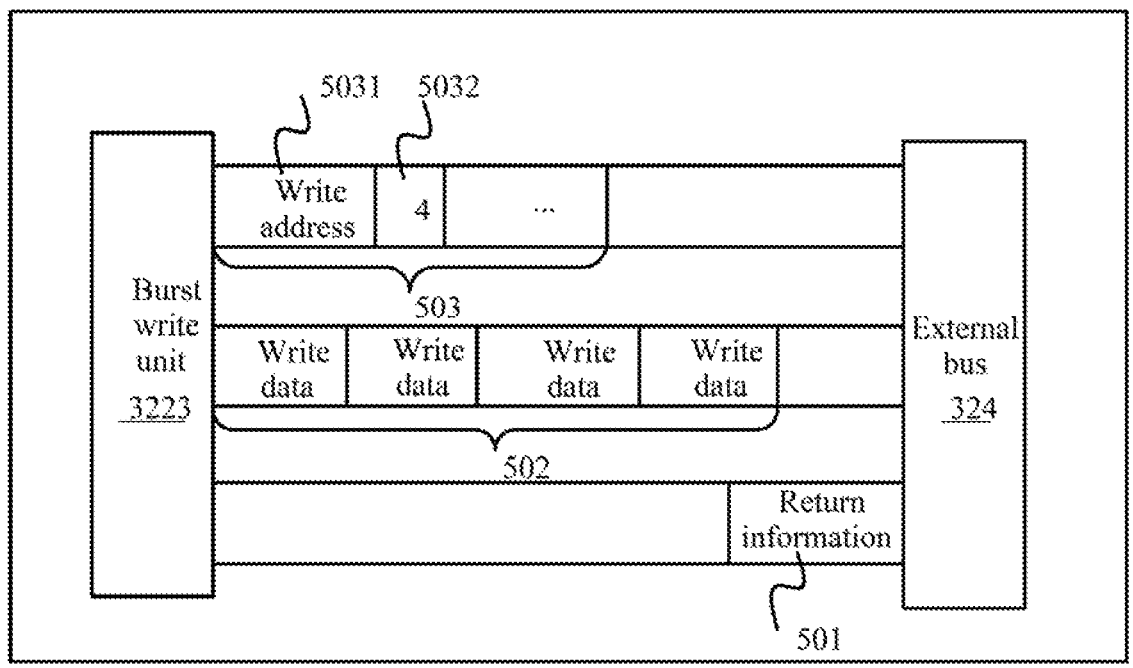
FIG. 5a is a schematic diagram of an exemplary burst write transmission.

FIG. 5a is a schematic diagram of an exemplary burst write transmission. As shown in. FIG. 5a, different transmission channels are used to transmit control signals 503, write data 502, and return information 501 between a burst transmission unit 3223 and an external bus 324. The control signals 503 include a write address 5031, a write length (4 in this example) 5032, and other control signals. The write data 502 includes four pieces of write data, which are sent to the external bus 324 through a data channel (or the internal bus 410 in FIG. 4). During a burst write transmission, a corresponding port of the external bus 324 (or internal bus 410) is controlled, and only the write data and control signals of the burst transmission unit 3223 can be received in sequence until write data of the length of 4 is received, and the external bus 324 sends the return information 501 back to the burst transmission unit 3223.

Figure 5B:
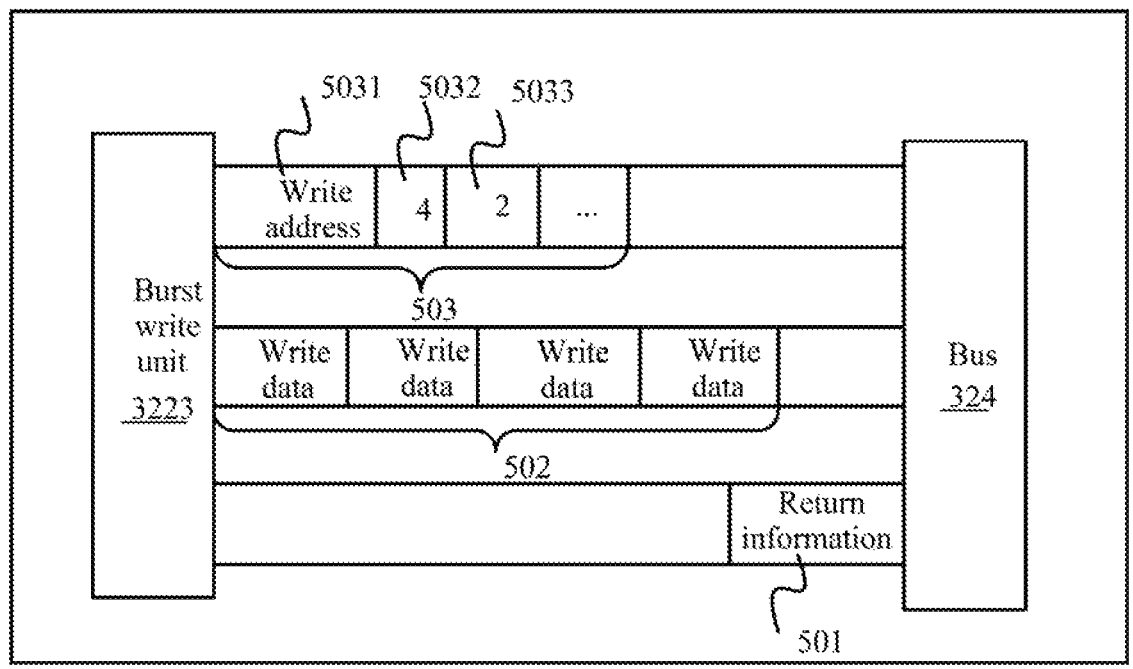
FIG. 5b is a schematic diagram of another exemplary burst write transmission.

FIG. 5b is a schematic diagram of another exemplary burst write transmission. FIG. 5a is different from FIG. 5b in that addresses of all pieces of write data of the write data 502 in FIG. 5a are increasing consecutive by default. In this example, however, the data unit 3223 specifies in the control signal 503 that addresses of all pieces of write data of the write data 502 are decreasing consecutive, as indicated by the flag bits '2' in the figure. In the case of increasing consecutive addresses, the external bus 324 (or internal bus 410) may directly send all the write data and the write address 5031 to the memory. The memory writes the write data to the write address 5031 and a consecutive continuous space according to an internal addressing logic. In the case of decreasing consecutive addresses, the external bus 324 (or internal bus 410) further needs to convert the write address 5031 to an initial address of an increasing continuous space, and then sends the write data and the initial address of the increasing continuous space to the memory, such that the memory writes the write data to the increasing consecutive space according to the internal addressing logic. In the case of decreasing consecutive addresses, the external bus 324 (or internal bus 410) may further send decreasing consecutive identifiers to the memory, and the memory converts the write address 5031 to the initial address of an increasing continuous space, and then writes the write data to the increasing continuous space.

Figure 6:
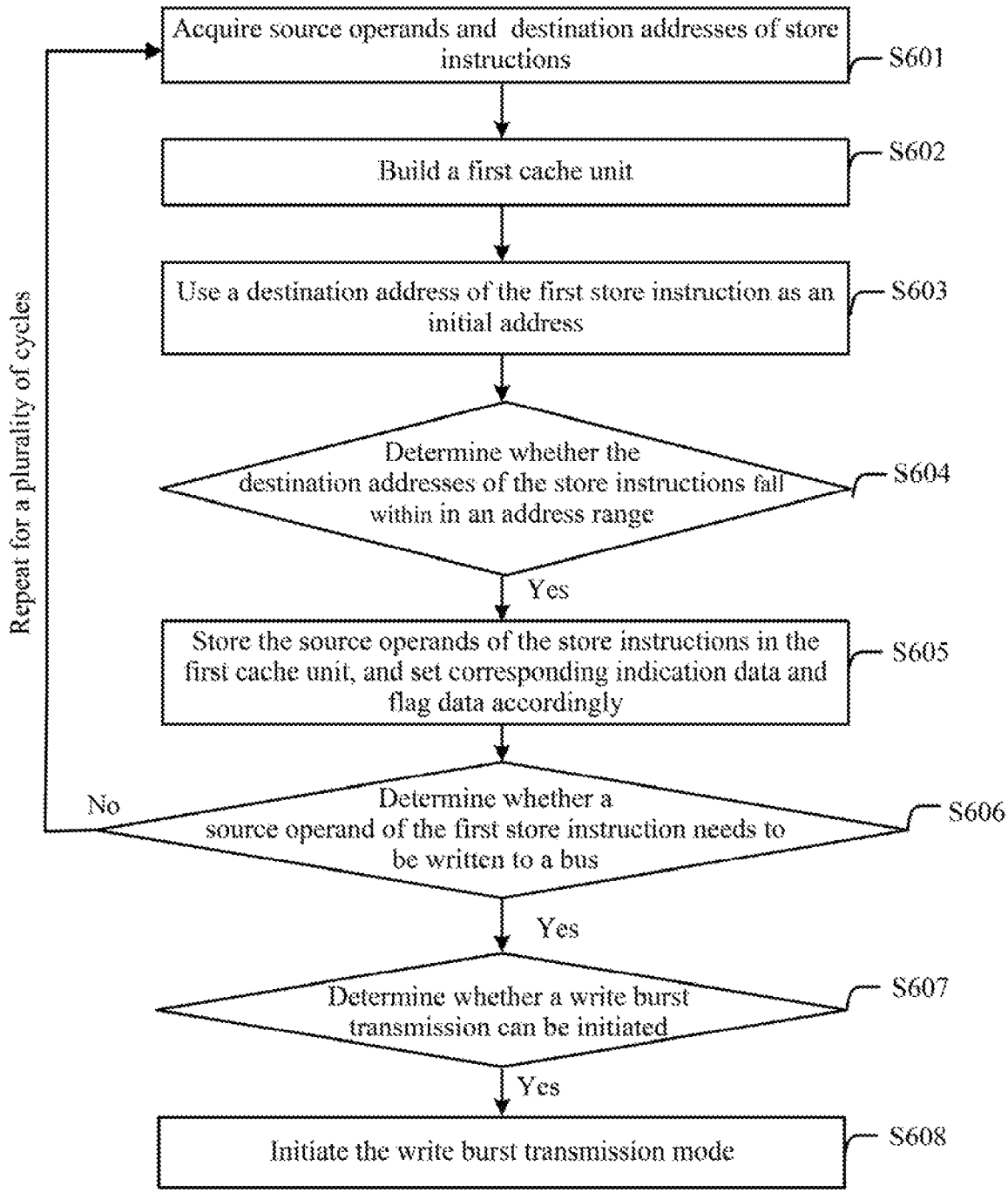
FIG. 6 is a flowchart of a method according to an embodiment of the present invention.

FIG. 6 is a flowchart of a method according to an embodiment of the present invention. The method shown in FIG. 6 may be executed by an electronic device including the processing core or processor described in any one of the above embodiments. The electronic device is, for example, a computer, a notebook computer, a cellular phone, an Internet Protocol device, a digital camera, a personal digital assistant (PDA), or a handheld PC. Embedded products may include network computers (NetPC), set-top boxes, network hubs, wide area network (WAN) switches. The method includes the following steps.

Step S601. Acquire source operands and destination addresses of store instructions.

Step S602. Build a first cache unit. A size of the cache unit may be pre-determined, and a storage space corresponding to the cache unit may be set in several times. For example, a storage space for one source operand and/or one destination address is added each time as required. In addition, the cache unit may not be a continuous storage space. Certainly, a second cache unit can also be built to cache non-consecutive destination addresses and source operands.

Step S603. Use a destination address of the first store instruction as an initial address.

Step S604. Determine whether a destination address of each store instruction falls within an address range. An address range of an existing cache unit is calculated. If a destination address of a store instruction is adjacent to the address range of the existing cache unit, step S605 is performed.

Step S605. Store a source operand of each store instruction in the first cache unit, and set corresponding indication data and flag data accordingly.

Step S606. Determine whether a source operand of the first store instruction needs to be written to a bus. In some embodiments, based on a time requirement of the first store instruction, it is determined whether the source operand of the first store instruction needs to be written to the bus; if not, step S601 follows, and otherwise S607 is performed.

Step S607. Determine whether a write burst transmission mode can be initiated. To be specific, this is to determine whether some source operands are valid and consecutive based on the indication data and flag data. If both conditions are met, step S608 is performed.

Step S608. Initiate the write burst transmission mode to transmit data.

In this embodiment, a plurality of source operands are transmitted as one data block in a burst transmission mode. This can help reduce handshake latency on addresses and improve write transmission efficiency.

Further, the plurality of source operands are combined into write data whose data length is equal to a data bit width of the bus, and a plurality of pieces of write data are transmitted as one data block in the burst transmission mode to further improve transmission efficiency.

According to the present invention, the above processing unit, processing system, and electronic device may be implemented in hardware, a dedicated circuit, software, or logic, or any combination thereof. For example, some aspects may be implemented in hardware, and other aspects may be implemented in firmware or software executable by a controller, a microprocessor, or other computing devices. The present invention is not limited thereto though. Although the various aspects of the present invention may be illustrated and described as block diagrams or flowcharts, or using some other graphical representations, it is well understood that, as non-limiting examples, the blocks, apparatuses, systems, techniques or methods described herein may be implemented in hardware, software, firmware, a dedicated circuit, logic, general hardware, a controller, or other computing devices, or some combination thereof. If involved, the circuit design of the present invention may be implemented in various components such as an integrated circuit module.

The above are merely preferred embodiments of the present invention and are not intended to limit the present invention. For those skilled in the art, the present invention may have various modifications and variations. Any modification, equivalent replacement, or improvement made without departing from the spirit and principle of the present invention shall fall within the protection scope of the present invention.

What is claimed is:

1. An apparatus, wherein the apparatus comprises a memory management unit coupled to a memory through a bus, and the memory management unit comprises:
    a first cache unit, adapted to store a plurality of first source operands and one first write address;
    a second cache unit, adapted to store at least one pair of a second source operand and a second destination address;
    a write cache module, adapted to discriminate between destination addresses of a plurality of store instructions, so as to store, in the first cache unit, a plurality of source operands corresponding to consecutive destination addresses in the destination addresses, and to store, in the second cache unit, non-consecutive destination addresses in the destination addresses and source operands corresponding to the non-consecutive destination addresses, wherein the first write address is an initial address of the consecutive destination addresses; and
    a bus transmission module, adapted to: transmit the plurality of first source operands and the first write address in the first cache unit to the memory through the bus in a write burst transmission mode, and sequentially transmit each pair of the second source operand and the second destination address in the second cache to the memory through the bus in another transmission mode.

2. The apparatus according to claim 1, wherein the first cache unit further stores indication data and flag data, wherein the indication data is used to indicate whether the plurality of first source operands are valid, and the flag data is used to indicate a consecutive manner of the destination addresses corresponding to the plurality of first source operands.

3. The apparatus according to claim 2, wherein the bus transmission module comprises:
    a burst determining unit, adapted to: determine, based on the indication data and the flag data, whether the write burst transmission mode can be started, and determine whether the destination addresses corresponding to the plurality of first source operands are increasing consecutive addresses or decreasing consecutive addresses; and
    a burst transmission unit, adapted to: if the destination addresses corresponding to the plurality of first source operands are increasing consecutive addresses, transmit the first write address and the plurality of first source operands to the bus in the write burst transmission mode; and if the destination addresses corresponding to the plurality of first source operands are decreasing consecutive addresses, send the first write address, identifiers indicating the decreasing consecutive addresses, and the plurality of first source operands to the bus in the write burst transmission mode.

4. The apparatus according to claim 3, wherein the bus directly forwards the first write address and the plurality of first source operands to the memory, and the memory performs different write operations based on increasing consecutive addresses or decreasing consecutive addresses.

5. The apparatus according to claim 3, wherein the bus adjusts the plurality of first source operands from decreasing consecutive addresses to increasing consecutive addresses, and sends the adjusted plurality of first source operands and the first write address to the memory.

6. The apparatus according to claim 3, wherein the plurality of first source operands are combined into a plurality of pieces of write data that all have a same data length, and data transmission is performed in the write burst transmission mode with a piece of write data as a unit.

7. The apparatus according to claim 6, wherein the data length of the write data is equal to a data bit width of the bus.

8. The apparatus according to claim 6, wherein the write burst transmission unit is further adapted to: when the data length of the write data is less than a data bit width of the bus, indicate, by using a cut-off flag, valid data transmitted to the bus.

9. The apparatus according to claim 1, wherein the bus transmission module performs data transmission in the write burst transmission mode in an address and data separated manner.

10. The apparatus according to claim 1, wherein the apparatus is further adapted to determine, based on a time requirement of a store instruction corresponding to the initial address, whether to start the bus transmission module now.

11. The apparatus according to claim 1, wherein the write cache module is further adapted to acquire source operands and destination addresses of the plurality of store instructions from a cache in an (Load/Store Unit) LSU component of an instruction pipeline structure.

12. The apparatus according to claim 1, wherein the apparatus is a processor core or a processor, and the bus and memory are located inside the apparatus.

13. The apparatus according to claim 1, wherein the apparatus is a processor core or a processor, and the bus and memory are located outside the apparatus.

14. A computer system, comprising the apparatus according to claim 1.

15. A system-on-chip, comprising the apparatus according to claim 1.

16. A method, comprising:
    acquiring source operands and destination addresses of a plurality of store instructions cyclically;
    storing a plurality of first source operands corresponding to consecutive destination addresses and an initial address of the consecutive destination addresses in a first cache unit, wherein the first cache unit further stores indication data and flag data, wherein the indication data is used to indicate whether the plurality of first source operands are valid, and the flag data is used to indicate a consecutive manner of the destination addresses corresponding to the plurality of first source operands; and
    transmitting the plurality of first source operands and the initial address in the first cache unit to a memory through a bus in a write burst transmission mode.

17. The method according to claim 16, wherein the transmitting the plurality of first source operands and the initial address in the first cache unit to a memory through a bus in a write burst transmission mode further comprises:
    determining, based on the indication data and the flag data, whether the write burst transmission mode can be started, and determining whether the destination addresses corresponding to the plurality of first source operands are increasing consecutive addresses or decreasing consecutive addresses;

when the destination addresses corresponding to the plurality of first source operands are increasing consecutive addresses, transmitting the initial address and the plurality of first source operands to the bus in the write burst transmission mode; and when the destination addresses corresponding to the plurality of first source operands are decreasing consecutive addresses, sending the initial address, identifiers indicating the decreasing consecutive addresses, and the plurality of first source operands to the bus in the write burst transmission mode.

18. The method according to claim 17, wherein the bus directly forwards the initial address and the plurality of first source operands to the memory, and the memory performs different write operations based on increasing consecutive addresses or decreasing consecutive addresses.

19. The method according to claim 18, wherein the bus adjusts the plurality of first source operands from decreasing consecutive addresses to increasing consecutive addresses, and sends the adjusted plurality of first source operands and the initial address to the memory.

* * * * *